Aug. 16, 1960     M. H. BURCKHARDT     2,949,047
HYDRODYNAMIC CHANGE-SPEED TRANSMISSION
Filed July 10, 1957     2 Sheets-Sheet 1

INVENTOR
MANFRED H. BURCKHARDT

BY Dicke and Craig.

ATTORNEYS

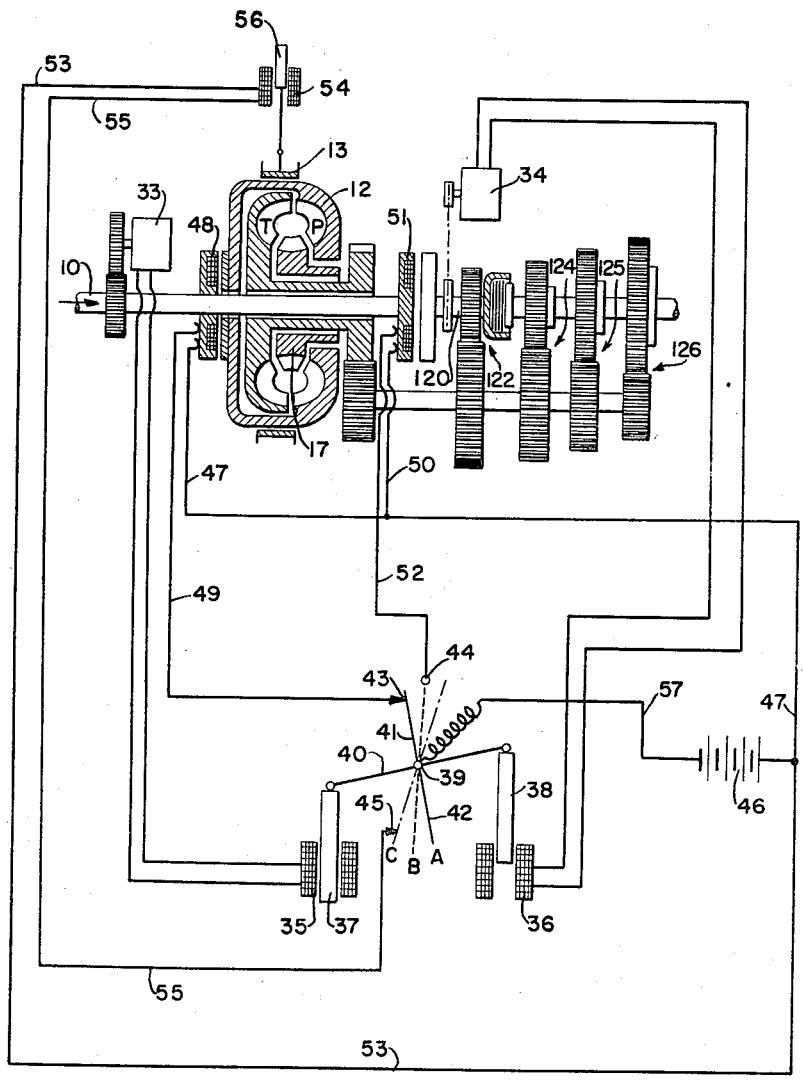

United States Patent Office

2,949,047
Patented Aug. 16, 1960

2,949,047

HYDRODYNAMIC CHANGE-SPEED TRANSMISSION

Manfred H. Burckhardt, Stuttgart, Germany, assignor to Daimler-Benz Aktiengesellschaft, Stuttgart-Unterturkheim, Germany Filed July 10, 1957, Ser. No. 671,089

Claims priority, application Germany July 12, 1956

32 Claims. (Cl. 74—732)

The present invention relates to a change-speed transmission unit provided with a hydrodynamic transmission such as a fluid coupling or torque converter and to a method of shifting the same, and more particularly relates to a change-speed transmission providing several transmission ratios connected in series with a hydrodynamic transmission which may be operatively engaged in the driving connection or disengaged therefrom, preferably automatically in dependence on some variable function, such as the rotational speed of one of the transmission members.

The usual connection of a fluid coupling or torque converter with an additional change-speed transmission exhibits various disadvantages. These disadvantages become apparent in a particularly disturbing manner during drives in mountainous terrain, especially during downhill drives, since the fluid coupling or torque converter itself only delivers a relatively slight braking moment so that, as a result thereof, the wheel brakes have to be engaged too often and thereby become overloaded, not to mention the rapid wear caused thereby. The shifting back to a lower speed which in itself is quite feasible, causes considerable difficulties with the known constructional combinations, even with transmissions shifted by means of force-locking devices, such as, for example, friction clutches. With transmissions which are shifted by means of form-locking devices as well as also with synchronized transmissions, a simple interconnection of a hydrodynamic device such as a fluid coupling or torque converter with a change-speed transmission, one behind the other, is quite impossible anyhow.

The present invention aims at avoiding these disadvantages by providing an arrangement and method for shifting which is as free from troubles and as shockless as possible and which takes place in a condition favorable for shifting, and consists essentially in that the fluid coupling or torque converter which is disengageable from the driving connection thereof is connected with the mechanical change-speed transmission by an intermediate gear providing a step-up transmission ratio in the normal direction of transmission of torque in such a manner that a transmission shaft, especially the transmission input shaft, is rotated at the same speed when connected via the fluid coupling or the torque converter during operation thereof with its most favorable slippage, for example, with a slippage of 0.3, as when driven directly by means of a by-pass clutch in the same speed or in different speeds of the change-speed transmission, and in that an arrangement is provided by means of which at a corresponding equality of rotational speed the drive is automatically shifted from the fluid coupling or torque converter to the by-pass clutch. In this manner, the clutch parts are subjected to practically no wear accompanied by a shock-free, reliable shifting operation.

As a result thereof, the additional change-speed transmission does not need to be a transmission shiftable by force-locking means, even with an appropriate transmission ratio of the intermediate change gear as described more fully hereinafter. Instead, a form-locking transmission may also be used. Shifting may be accomplished in such a manner that within the same transmission speed with equality of speed of the engine shaft and of the driven or transmission input shaft, the transmission of driving torque is shifted from the hydrodynamic transmission to direct drive via the by-pass clutch. Preferably, however, the effective disengagement of the hydrodynamic transmission and the transmission ratio of the intermediate converter gear are so selected that, especially with transmissions shifted by means of form-locking devices, the transmission output shaft with the most favorable slip of the hydrodynamic transmission establishing the drive and with an engaged lower speed has the same or approximately the same rotational speed as with an engaged by-pass clutch and with an engaged higher speed, especially the next higher speed.

In order to be able to also use the hydrodynamic transmission as brake and in accordance with a particularly favorable construction of the present invention, a hydrodynamic brake braking the pump wheel of the hydrodynamic transmission such as a torque converter and an arrangement are provided by means of which the hydrodynamic brake is automatically engaged if the rotational speed of the driving engine exceeds that of the transmission input shaft by a predetermined amount, preferably approximately thirty percent. By engagement of the hydrodynamic brake which acts on the pump wheel thereof, the hydrodynamic transmission operates as a vortex- or eddy-brake and in that manner produces a high braking moment.

Accordingly, it is an object of the present invention to provide a transmission unit including a hydrodynamic device and a change-speed transmission which is relatively simple in construction and yet versatile in the operation thereof.

It is another object of the present invention to provide a shifting arrangement for a hydrodynamic change-speed transmission in which the hydrodynamic device and the change-speed transmission are connected in series with each other and wherein shifting takes place in as shock-free as possible a manner regardless of whether the change-speed transmission is shifted into a higher or lower gear and regardless of whether or not the vehicle is driven up-hill or down-hill.

Still another object of the present invention is the provision of a transmission unit consisting of a hydrodynamic device and a mechanical change-speed transmission connected seriatim in which the hydrodynamic device is effectively used as hydrodynamic brake under certain operating conditions.

Still another object of the present invention is to provide a hydrodynamic change-speed transmission suitable for manual, semi-automatic or fully automatic operation which simultaneously therewith protects the engine against excessive speeds, especially during down-hill drives while utilizing the hydrodynamic device as braking device.

Still another object of the present invention is to provide an interconnection between the hydrodynamic device and the mechanical change-speed transmission which is such as to provide a predetermined transmission ratio between the transmission output shaft and the engine shaft as the operation of the transmission unit is shifted from torque converter operation to an operation by-passing the same.

Still another object of the present invention is the provision of a transmission unit including a hydrodynamic device and mechanical change-speed transmission in which the mechanical change-speed transmission may be shifted by either force-locking clutches or form-locking clutches and in which shifting into a lower speed may be accomplished notwithstanding the use of such clutches.

A still further object of the present invention is the provision of a transmission unit comprising a hydrodynamic device and a change-speed transmission and a control arrangement therefor which appropriately shifts the various clutches and brakes of the transmission unit so as to utilize the transmission unit in a most effective manner.

Further objects, features and advantages of the present invention will become more obvious from the following diescription when taken in connection with the accompanying drawing, which shows, for purposes of illustration only, three embodiments in accordance with the present invention and wherein:

Figure 3 illustrates a transmission unit similar to Figure 2 with an automatic electrical shifting arrangement.

The term "force-locking" device refers herein to devices in which two parts are coupled or connected with each other by the application of an external force producing the engagement as is the case, for example, in hydraulically or mechanically actuated friction clutches or electromagnetically actuated clutches, while the term "form-locking" devices refers to devices in which two parts are coupled or connected with each other by reason of the particular form or shapes thereof as is the case, for example, in jaw-clutches or the like.

Figure 1:
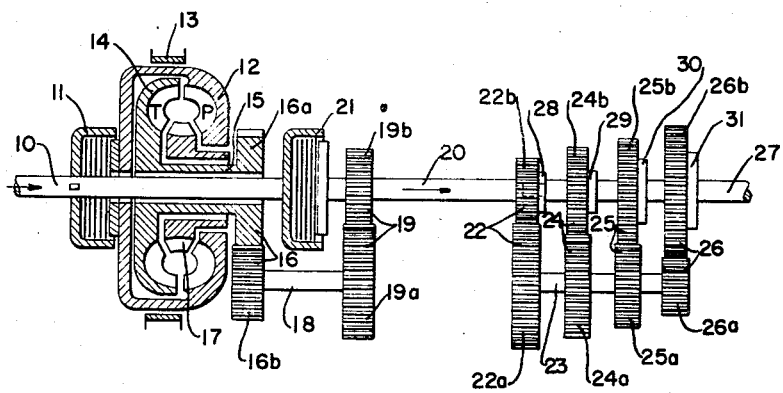
Figure 1 illustrates in principle a transmission unit in accordance with the present invention including a hydrodynamic device, such as a torque converter, an a countershaft-type change-speed transmission connected behind the torque converter and shifted, for example, by force-locking devices.

Referring now to the drawing, wherein like reference numerals are used to designate like parts throughout the various views, and more particularly to Figure 1, reference numeral 10 designates therein the engine shaft which is connected by a force-locking clutch 11 with the pump or impeller wheel or primary member 12 of the hydrodynamic transmission such as a torque converter. A torque converter brake 13 is provided which is operative to selectively brake the primary member 12. The turbine wheel or secondary member 14 is located within the primary member 12. The secondary member 14 is connected in any suitable manner, for example, by means of a spline connection with the hollow shaft 15 which surrounds the engine shaft 10. The guide wheel 17 of the torque converter is also disposed within the primary member 12 and is connected with the housing in any suitable manner, for example, rigidly or by means of a one-way engaging device as is conventional with torque converters.

The hollow shaft 15 is operatively connected with the countershaft 18 over the intermediate converter gear set 16 consisting of the pair of meshing gears 16a and 16b, and the countershaft 18 in turn is connected with the driven shaft 20, for example, constituting the input shaft of the change-speed transmission connected rearwardly of the torque converter by means of the intermediate change gear set 19 consisting of the pair of meshing gears 19a and 19b. A force-lockingly shifted by-pass clutch 21, i.e., a clutch which is shifted or engaged by force-locking means, is operative to connect the engine shaft 10 directly with the shaft 20.

Any suitable change-speed transmission which provides the desired numbers of transmission ratios including forward and reverse speeds, such as a countershaft transmission, a planetary gear transmission, a tandem planetary gear transmission, etc., may follow the shaft 20 as indicated in the drawing. In the illustrated embodiment the change-speed transmission comprises, for example, gear sets 22, 24, 25 and 26 consisting of meshing gear pairs 22a and 22b, 24a and 24b, 25a and 25b, and 26a and 26b, respectively. The gears 22a, 24a, 25a and 26a are thereby securely mounted on the countershaft 23 for common rotation therewith in any suitable manner, for example, by a spline connection, press fit or the like.

The gear wheel 22b is rigidly mounted for common rotation with the shaft 20 and may be directly coupled with the transmission output shaft 27 by means of a clutch 28 in order to obtain a fourth or direct speed. For purposes of obtaining third, second and first speeds, the loosely or rotatably mounted gear wheels 24b, 25b and 26b may be selectively connected with the transmission output shaft 27 by means of respective clutches 29, 30 and 31. The clutches 28, 29, 30 and 31 are preferably constructed as friction clutches or any other type of force-locking clutches.

A combination of the arrangement described hereinabove with a change-speed transmission shifted, for example, by form-locking devices is illustrated in the modification according to Figure 2. The parts of the modification of Figure 2 corresponding to similar parts in Figure 1 are designated therein by corresponding reference numerals of the one-hundred series. The gear wheels 122a, 124a, 125a and 126a of the corresponding gear sets 122, 124, 125 and 126 of the pairs of meshing gears providing the third, second and first speeds, respectively, are rigidly mounted for common rotation therewith on the extension of the countershaft 18. The transmission input shaft 120 may be connected directly with the transmission output shaft 127 by means of a clutch 128 shifted or engaged by form-locking means such as, for example, by means of claws or the like, for purposes of obtaining the fourth or direct speed. The gear wheels 124b, 125b, and 126b of the aforementioned sets of pairs of meshing gears are rotatably mounted on the output shaft 127. The gear wheels 124b, 125b and 126b are also adapted to be coupled or connected with the transmission output shaft 127 by means of clutches 129, 130 and 131, respectively, which may be clutches shifted by form-locking devices, such as claws or the like.

Under those conditions, to be described more fully hereinafter, form-lockingly shifted change-speed clutches may also be used in the embodiment according to Figure 1. Moreover, in all cases, form-lockingly shifted clutches may be replaced by force-lockingly shifted clutches.

OPERATION

Figure 2:
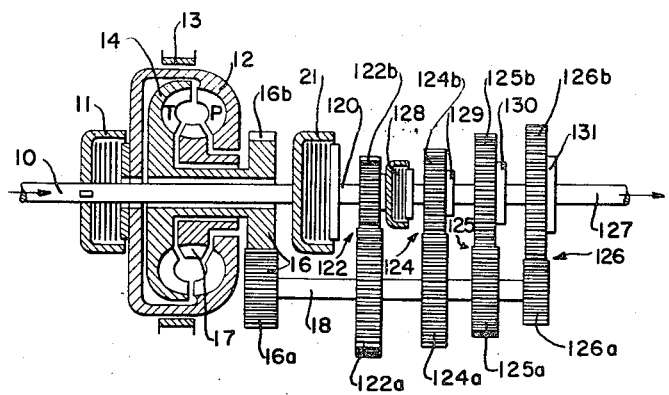
Figure 2 illustrates a transmission unit in accordance with the present invention similar to that of Figure 1 and provided with built-in change-speed transmission shifted by form-locking devices.

The operation of the transmission units illustrated in Figures 1 and 2 and the manner of shifting the same is as follows:

The shifting may take place in such a manner in a transmission unit according to either of the two embodiments of Figures 1 and 2, provided that force-lockingly shifted clutches are used in both embodiments, that the transmission of torque is shifted in a shock-free manner from torque converter operation to by-pass clutch operation in each of the speeds of the change-speed transmission connected behind the torque converter or, in the simplest possible embodiment of the present invention, in a one-speed transmission, i.e., a transmission unit corresponding to Figure 1 without the change-speed transmission connected therebehind, within this speed, in that the transmission ratio of the intermediate change gear 16 of Figures 1 and 2 is so selected that the driven shaft or transmission input shaft 20 or 120 rotates with the same rotational speed as the engine shaft 10 when the torque converter operates within the most favorable range thereof.

While the following description of the operation of a transmission unit is applicable to both Figures 1 and 2 provided clutches 28, 29, 30 and 31 as well as clutches 128, 129, 130 and 131 are force-locking clutches, specific reference, for the sake of simplicity, will be made to Figure 1 since the embodiment of Figure 2 will be described in connection with the operation of a transmission unit in accordance with the present invention having form-locking clutches.

For purposes of starting the vehicle, the engine shaft 10 is connected over the clutch 11 with the primary member or impeller wheel 12 of the torque converter whereby the turbine wheel 14 commences to exert a torque with a very high starting conversion on the shaft 20 over the hollow shaft 15, the intermediate change gear 16, the countershaft 18 and the gear pair 19 (Figure 1). The clutch 21 is still disengaged. As a result thereof, a gearing-up or speed-up of the shaft 20 is produced by the intermediate change gear 16, 19 which is preferably selected at about 30% corresponding to the most favorable condition of the torque converter characteristics.

If, therefore, after acceleration of the engine and of the torque converter with a gradually decreasing slippage and with a starting process corresponding to the characteristics of the torque converter, the hollow shaft 15, in the most favorable torque converter range of, for example, $i_n=0.7$, rotates approximately thirty percent slower than the engine shaft 10, then by reason of the transmission speed-up ratio of the change gear 16, 19 providing effectively an overdrive, the rotational speed of the shaft 20 is approximately the same as that of the engine shaft 10. The clutch 21 may, therefore, be engaged without relative rotation between the two clutch halves in a shock-free manner. Thereupon, the clutch 11 is disengaged. The torque converter idles along, and the vehicle drives without losses in the torque converter with a drive connection between the engine and the driven shaft, constituted, for example, by the drive shaft of a motor vehicle.

SHIFTING INTO HIGHER SPEEDS

With a change-speed transmission connected behind the torque converter, the disengagement of the presently engaged speed and the engagement of a new speed may thereby take place immediately after the disengagement of the by-pass clutch 21 and the engagement of the torque converter clutch 11 which may be accomplished in any suitable manner either manually, semi-automatically by the actuation of a gear-shift preselector lever, or fully automatically, for example, in dependence on the relative rotational speed of engine shaft 10 and transmission output shaft 27 and/or on the torque delivered by the engine as determined, for example, by the position of the gas pedal.

SHIFTING INTO LOWER SPEEDS

While ordinarily no difficulties are present when thus shifting upwardly, i.e., to a higher speed, the conditions during downwward shifting into a lower speed are ordinarily much more complicated. The torque converter brake 13 is appropriately so connected with the automatic shifting arrangement of any suitable electric, mechanical, hydraulic or pneumatic construction that during simultaneous disengagement of the torque converter clutch 11 and of the by-pass clutch 21, it always becomes effective when the rotational speed of the transmission, for example, during down-hill drive, exceeds the engine rotational speed by a predetermined amount. The value of this amount is determined by the flexibility of the engine and as a rule may amount to approximately thirty percent.

The tightened or engaged torque converter brake 13 holds the pump wheel 12 stationary and thereby hydraulically brakes the turbine wheel 14 driven from the change-speed transmission or vehicle wheels. The rotational speed of the turbine wheel 14 thereby decreases very rapidly until equilibrium exists between the driving torque and the braking torque. Preferably, however, the automatic arrangement is provided in such a manner that already before attaining this equilibrium, and more particular, at that moment when the engine shaft 10 and the transmission input shaft 20 have the same rotational speed, the torque converter brake 13 is again disengaged and the by-pass clutch 11 re-engaged. As a result thereof, braking is obtained henceforth with the engine whereas with engaged converter brake 13 the engine is disengaged and merely idles along.

By such an automatic shifting arrangement which may be of any suitable conventional construction, it is possible to achieve that at any time the transmission may be shifted back to a lower speed and the engine is never rotated at an excessive speed. This is particularly important also for diesel engines in which a limitation of the rotational speed is particularly necessary. The actuation and operation of shifting into a lower speed is very simple as will be explained by reference to the following two specific examples:

I. *Up-hill drive*

Assuming that the vehicle is driving up an incline, i.e., climbing a hill or mountain during which time the engine operates at open throttle or full gas. If the driver now determines that the engaged speed is no longer sufficient to overcome the incline, then he engages a lower speed, i.e., at first the by-pass clutch 21 is initially disengaged and the torque converter clutch 11 is engaged, which means that the operation of the transmission unit is shifted back to torque converter operation as also takes place during shifting into a higher speed. The position of the control member controlling the engine output, for example, of the gas pedal may thereby remain unchanged, i.e., may thereby remain at open throttle position. Thereupon, after only a slight delay in time, the lower speed is engaged in any suitable manner by means of the corresponding force-locking clutch which may take place by means of the same shifting lever as the alternate shifting of the clutches 21 and 11. As a result thereof, the rotational speed of the turbine wheel 14 increases. Simultaneously therewith, however, the engine which, during the shifting operation, was running in the meantime practically without load has increased its rotational speed to such an extent that it has nearly attained the rotational speed of the turbine wheel.

Furthermore, by reason of the resistance at the drive, the rotational speed of the turbine wheel 14 is decreased until rotational speed equality exists again between the engine shaft 10 and the transmission input shaft 20. Consequently, the torque converter brake 13 will not normally become operative since the rotational speed of the transmission input shaft 20 during the described shifting operation with an up-hill drive does not exceed as a rule at any time by the predetermined limiting amount of, for example, thirty percent, the rotational speed of the engine shaft 10.

Consequently, the driver only has to move the shifting lever (not shown) determining the preselection of the speeds whereby the clutch 21 is disengaged, the clutch 11 is engaged, and thereupon the preselected lower speed is engaged. The adjustment of the rotational speeds as well as the re-engagement of the by-passing clutch 21, with simultaneous disengagement of the torque converter clutch 11, thereupon takes place automatically in any suitable manner.

II. *Down-hill drive*

During down-hill drive, the shifting operation is somewhat different. The engine thereby operates in the upper rotational speed range. If the driver is unsuccessful notwithstanding the engine brake to maintain the vehicle speed, then he seeks by actuation of the forward speed lever to shift back to a lower speed. In particular, the following steps take place thereby:

At first, the by-pass clutch 21 is initially disengaged and the torque converter clutch 11 re-engaged, so that the engine or engine shaft 10 is connected with the pump wheel 12 of the torque converter. Upon further movement of the preselector level, the lower speed of the change-speed transmission is engaged. As a result thereof, the rotational speed of the turbine wheel 14 is considerably increased so that the rotational speed of the transmission input shaft 20 surpasses that of the engine shaft 10 by such an amount that the torque converter brake 13 becomes operative.

It is, however, appropriate to interconnect the torque converter brake 13 into the automatic shifting arrangement or mechanism by the interposition of a suitable delay mechanism in order that the normal equalization movement is not surpassed by the automatic shifting arrangement. The time delay thereby amounts advantageously to approximately one to two seconds.

The automatic shifting arrangement thereupon disengages the engine by disengaging clutch 11 and then brakes the pump wheel 12 of the torque converter by means of converter brake 13. As a result thereof, the vehicle speed decreases which may take place for such a length of time as appears proper to the driver. If the desired vehicle speed is attained, then the driver gives smoothly gas. As a result thereof, the engine which in the meantime was idling is accelerated. As soon as the engine shaft 10 rotates at the same speed as the transmission input shaft 20, the torque converter brake 13 is disengaged and the engine is connected directly with the change-speed transmission by engagement of clutch 21.

Consequently, the driver only needs to actuate the shifting lever for the speed selection, take his foot off the gas pedal, and after attaining the desired speed again give gas. The engine can never be overloaded or overtaxed by operating at an excessive speed. Moreover, a faulty shifting is impossible.

When driving down-hill with a transmission unit according to the present invention, the driver can shift back directly, for example, from the sixth speed to the first speed of the change-speed transmission without danger to any parts. As a result of such shifting back, a very large braking moment becomes effective which brakes the vehicle in the shortest possible time. The entire braking energy is thereby absorbed by the hydraulic oil and is converted into heat. With vehicles with which recurrent braking must be expected, it is, therefore, necessary to provide an oil cooler of appropriate construction to dissipate the thus converted heat. The hydraulic brake thereby offers the advantage of being very soft and of engaging very smoothly.

For purposes of actuating the automatic shifting arrangement, preferably two rotational speed indicators are used which indicate the rotational speed of the engine shaft and of the transmission input shaft. The rotational speed indicators may be, for example, alternating current generators which produce a voltage proportional to the rotational speed thereof, or oil pumps, the output quantity of which is proportional to the rotational speed thereof. These rotational speed indicators actuate the shifting mechanism of the automatic transmission arrangement so that with a rotational speed of the transmission input shaft 20 lower than that of the engine shaft 10, the rotational speed indicators engage the clutch 11 and, in contrast thereto, disengage the brake 13 and the clutch 21, whereas with rotational speed equality of shafts 10 and 20 they engage the clutch 21 and, in contrast thereto, disengage the clutch 11 and the brake 13. With the transmission input shaft overtaking or rotating faster than the engine shaft 10, by more than thirty percent, the torque converter brake 13, is engaged with the simultaneous disengagement of the clutches 11 and 21.

The aforementioned shifting operation is generally useable only for transmissions shifted by force-locking devices since shifting from torque converter operation to by-pass clutch operation takes place itself within the new speed engaged already prior thereto so that the adjustment of the rotational speed takes place only after the engagement thereof.

If, however, the transmission is to be shifted by means of form-locking devices, for example, by displaceable gears, claw clutches, synchronized clutches or the like, it is necessary, as a rule, to undertake the engagement of the new speed only after obtaining speed adjustment and existing speed equalization, i.e., preferably together with the transition from torque converter operation to by-pass clutch operation. Preferably, this may take place in such a manner that initially the drive takes place in a lower speed in torque converter operation and that thereupon, within the most favorable torque converter range, the next speed is engaged while by-passing the torque converter. In principle, there is no difference whether the transmission is constructed according to Figure 1 with a change-speed transmission connected behind the torque converter or according to Figure 2 whereby in the latter case the gear pairs 19 and 22 of Figure 1 are combined into and substituted by the gear pair 122. With different transmission ratios of the gear pairs 19 and 22 in Figure 1, these different transmission ratios would have to be taken into consideration in the following calculations:

Let, for example, according to Figure 2, $i_n$ = rotational speed ratio between the pump wheel 12 and the turbine wheel 14 of the torque converter,
$i_w$ = the transmission ratio of the intermediate converter gear 16,
$i_0$ = the transmission ratio of the intermediate transmission gear 122,
$i_1$ = the transmission ratio of the first speed gear 126,
$i_2$ = the transmission ratio of the second speed gear 125,
$i_3$ = the transmission ratio of the third speed gear 124, then with the equal jumps of the steps in the transmission ratios of the change-speed transmission, $$\frac{i_1}{i_2} = \frac{i_2}{i_3} = \frac{i_3 \times i_0}{1} \tag{1}$$

OPERATION

The shifting operation of a transmission unit having form-lockingly shifted clutches as illustrated in Figure 2, in principle takes place as follows:

During idling speed, all the clutches are disengaged and the transmission speeds are disengaged.

Prior to starting, the first speed, i.e., the gear set 126 of the change-speed transmission is engaged by means of clutch 131, and, for purposes of starting, at first the clutch 11 is re-engaged.

The transmission ratio of the intermediate converter gear 16 is now so selected that with the most favorable rotational speed conditions $i_{nopt}$ of the torque converter in a lower speed, i.e., in first speed, after disengagement of the clutch 11 and with the rotational speeds of the engine shaft 10 as well as of the transmission output shaft 127 remaining constant, the transmission input shaft 120 rotates at the same speed as the engine shaft 10 after shifting to the next higher speed, for example, to the second speed by the use of the gear set 125 consisting of pair of gears 125a and 125b. If, $n_m$ = the rotational speed of the engine shaft,
$n_e$ = the rotational speed of the transmission input shaft 120,
$n_y$ = the rotational speed of the countershaft 123, and
$n_a$ = the rotational speed of the transmission output shaft 127, and more particularly, $n_{a1}$, $n_{a2}$ and $n_{a3}$ are the respective speeds thereof in first, second and third speed, then according to the following equation, a shifting point is obtained for the rotational speed of the driven shaft 127 in first speed with the torque converter operation which is as follows:

$$n_{a1} = n_e \cdot i_0 \cdot i_2 \tag{2}$$

Since it is supposed that $n_{a1}=n_{a2}$ and $n_e=n_m$, the following conditions obtain:

$$i_0 \cdot i_2 = i_{nopt} \cdot i_w \cdot i_1$$

or $$i_w = \frac{i_0 \cdot i_z}{i_7 \cdot i_{nopt}} \quad (3)$$

Consequently, if the transmission ratios are selected according to the aforementioned Equation 3, then the vehicle reaches, in first speed with the torque converter operation, a speed which it would obtain in second speed without the torque converter with the same engine speed.

A schematic showing for a corresponding shifting arrangement is explained by reference to the embodiment according to Figure 3 wherein, for the sake of simplicity, electrically shifted clutches are assumed for the torque converter clutch 11 and by-pass clutch 21 as well as an electrically shifted torque converter brake 13. It is understood, however, that instead of these electrically energized devices, clutches and brakes shifted mechanically, hydraulically or pneumatically or in any other manner may be provided.

A generator 33 driven by the engine shaft 10, a so-called primary rotational speed indicator, on the one hand, and a generator or secondary speed indicator 34 driven by the transmission input shaft 120, on the other, serve as speed sensing means. The speed indicator 33 is connected with the output thereof to a coil 35 whereas the speed indicator 34 is connected with a coil 36. Coil 35 is provided with a movable magnetic core 37 whereas coil 36 is provided with a movable magnetic coil 38. The two magnetic cores 37 and 38 are connected with each other by a scale-beam-like lever 40 rotatably supported at 39 which carries the two further lever arms 41 and 42. Lever arm 41 is adapted to be brought into operative engagement with the abutment contact 43 and with the sliding contact 44 whereas lever arm 42 is adapted to be brought into operative engagement with the abutment contact 45. A line 47 leads from the battery 46 to the magnetic clutch 48 serving as torque converter clutch and corresponding to the clutches 11 of Figures 1 and 2. A line 49 leads back from clutch 48 to the abutment contact 43. A second line 50 branching off from the line 47 connected with one terminal of battery 46, leads to the magnetic clutch 51 serving as by-pass clutch and corresponding to clutch 21 in Figures 1 and 2. A line 52 leads back from clutch 51 to the sliding contact 44. A line 53 leads from the same terminal of the battery 46 to the magnetic coil 54, and from the magnetic coil 54 a line 55 leads back to the abutment contact 45. The magnetic coil 54 actuates by means of its movable core 56, the torque converter brake 13. The scale-beam lever 40 with the two arms 41 and 42 thereof is further connected over line 57 with the opposite pole of the battery.

If the engine rotational speed and therewith the speed of engine shaft 10 is very large with respect to the rotational speed of the transmission input shaft 120, or if the transmission input shaft 120 stands still, then the force exerted by the solenoid 35 on the lever 40 predominates over that of solenoid 36. Consequently, the lever 40 and therewith arms 41 and 42 take the position indicated in Figure 3 in full lines and designated by A, whereby the arm 41 is in contact with the abutment contact 43, thereby closing over line 49 the circuit of clutch 48 leading from battery 46 over line 57, arm 41, contact 43, line 49 to the clutch 48, corresponding to the torque converter clutch 11 of Figures 1 and 2, and then over line 47 back to the battery 46. With increasing rotational speed of the transmission input shaft 120, the generator 34 increasingly produces larger amounts of current so that finally the lever 40, in opposition to the effect exerted thereon by the solenoid 35, is rotated in the clockwise direction until the arm 41 reaches the position indicated in Figure 3 by the dash lines and designated by B in which the arm 41 engages the magnetic clutch 51 corresponding to the by-pass clutch 21 of Figures 1 and 2 over the sliding contact 44 and line 52 and thereby simultaneously disengages the clutch 48 corresponding to clutch 11.

The generators 33 and 34 and/or the solenoids 35 and 36 are so selected and constructed that this shifting takes place if the torque converter, in accordance with the aforementioned Equation 3, operates in the most favorable range thereof. If, at that moment, shifting takes place, for example, from first speed to second speed, then the second speed may be engaged without any shocks. The engagement of the second speed may thereby take place manually in that, for example, an indicating arrangement of any suitable construction such as an electrically operated visual indicating arrangement formed, for instance, by flashing electric lights, connected with the sliding contact 44, in parallel with clutch 51, indicates the moment for shifting, or also semi- or fully automatically in any conventional manner, for example, by mechanically electrically, hydraulically or pneumatically actuated automatic gear shift mechanisms. The former case, i.e., the semi-automatic shifting, takes place, for example, if the new speed already had been preselected manually, whereas the actual shifting only takes place automatically upon the occurrence of the shifting condition, for example, by a speed-shifting arrangement which is mechanically coupled with and actuated by the lever 40, for example, connected to the sliding contact 44. With fully automatic shifting, the lever 40 or a corresponding organ appropriately serves as step-like shifting member which successively shifts and engages the individual speeds of the change-speed transmission.

As a result of the automatic shifting arrangement, shifting took place from torque converter operation in a lower speed, for example, in first speed to by-pass clutch operation in a higher speed, for example, in second speed.

If, notwithstanding the automatic shifting arrangement, for example, as a result of preselection or by actuation of an arrangement for disengaging the automatic shifting mechanism, an excessive speed of the transmission input shaft 120 is possible, then the generator 34 connected therewith produces, for example, by reason of the compound characteristic thereof obtained by appropriate construction and connection of the windings thereof, so much current that the lever 40 is further rotated in the clockwise direction until the arms 41 and 42 thereof reach the position shown in Figure 3 in dot-dash lines and designated therein by C.

As a result of such clockwise direction, the arm 41 again disengages the sliding contact 44 and in the corresponding position of the lever 40 the magnetic coil 54 of the torque converter brake 13 is supplied with current over arm 42, abutment contact 45 and lines 55 and 53. As a result thereof, the brake 13 is energized and the primary member 12 of the torque converter is held stationary whereby the torque converter becomes operative as a liquid vortex or eddy brake and thereby produces a strong braking moment. As a result of the interruption of the current circuit at the sliding contact 44, the clutch 51 corresponding to the clutch 21 of Figures 1 and 2 is disengaged simultaneously therewith. Consequently, the engine idles along and is protected against excessive rotational speeds. The engine thereupon quickly slows down with the rotational speed thereof whereas simultaneously therewith by reason of the effectiveness of the torque converter brake the rotational speed of the transmission input shaft 120 also decreases so that rapidly rotational speed equality again obtains. After the decrease of the vehicle speed, shifting may now take place without danger since by reason of the synchronous operation between shafts 10 and 120 or 20 obtained by the use of the torque converter and of the intermediate change gears 16 and 19 the clutch 21 may be re-engaged without shocks. Possibly a locking arrangement may be provided which prevents disengagement of the hitherto engaged speed with a rotational speed in excess of a predetermined speed. This locking arrangement, for example, might be controlled by means of the secondary speed indicator 34 in any suitable manner, for example, mechanically, electrically, pneumatically or hydraulically by disabling the control member or organ effecting change in the transmission ratio of the change-speed gear.

If, instead of the electric automatic shifting arrangement of Figure 3, a hydraulic or pneumatic automatic shifting arrangement is used, then pumps may be provided as primary and secondary speed indicators and pressure pistons may be provided in the place of the solenoids.

It is, of course, also understood that the shifting arrangement according to Figure 3 is also applicable to the embodiment according to Figure 1 when form-locking clutches are used therein for the force-locking clutches 28, 29, 30 and 31 while electromagnetically actuated clutches are substituted for the clutches 11 and 21 and electromagnetically energized brake is substituted for the brake 13 thereof.

Furthermore, instead of being connected rearwardly of the torque converter, the change-speed transmission may also be connected in front thereof or, possibly, a change gear may be connected in front of the torque converter as well as behind the torque converter. Furthermore, an arrangement may be provided by means of which the automatic shifting arrangement becomes ineffective, for example, a switch interconnected in the line 57 which possibly simultaneously with the interruption of the line 57 permits the battery 46 to be selectively and directly connected with the energizing coils of the clutches 48 and 51.

An example of an automatically controlled transmission to which the present invention is applicable is disclosed in United States Patent No. 2,756,616 by Hans-Joachim M. Foerster, issued July 31, 1956, and entitled "Speed Change Transmission for Motor Vehicles." Other automatically shifted transmissions to which the present invention is applicable are disclosed in the copending United States application Serial No. 260,668 by Hans-Joachim M. Foerster, filed December 8, 1951, entitled "Speed Change Transmission, Particularly for Motor Vehicles," and in the copending United States application Serial No. 297,960 by Hans-Joachim M. Foerster, filed July 9, 1952, entitled "Speed Change Transmission," both assigned to the same assignee as the present application. The last-mentioned copending application may thereby be substituted for the mechanical change speed gear disclosed herein.

A control arrangement for automatically shifting the transmission is disclosed, for example, in my copending application Serial No. 650,268, filed April 2, 1957, and entitled "Controller for an Automatic Motor Vehicle Transmission."

While I have shown and described several preferred embodiments in accordance with the present invention, it is understood that the same is not limited thereto but is susceptible of many changes and modifications within the spirit of the present invention, and I intend to cover all such changes and modifications as encompassed by the appended claims.

I claim:

1. A transmission unit comprising input means, output means, a hydrodynamic transmission device, means constituting two motion transmitting trains for selectively and alternately connecting said input means with said output means, one of the said motion transmitting trains including said hydrodynamic device, change gear means having a predetermined transmission ratio and selectively engageable clutch means for connecting said hydrodynamic device and said change gear means with said input and output means, the other of said motion transmitting trains including further clutch means for directly connecting said input means with said output means in by-passing relationship with respect to said hydrodynamic device and said change gear means, said hydrodynamic device being operative at varying slippages with one predetermined slippage thereof being the most favorable one as regards operation of said hydrodynamic device, said predetermined ratio being so selected that said output means rotates at essentially the same speed as said input means with said first-mentioned clutch means engaged and with said hydrodynamic device operating at said most favorable slippage, and automatic control means for automatically disengaging said first clutch means and engaging said further clutch means upon essentially equality in rotational speeds between said input means and said output means when said hydrodynamic device operates essentially at said most favorable slippage.

2. A transmission unit according to claim 1, wherein said hydrodynamic transmission device includes a primary member and a secondary member, further comprising brake means for one of said transmission members, and wherein said automatic control means includes automatic actuating means for said brake means to prevent excessive rotation of said output means.

3. A transmission unit according to claim 2, wherein said brake actuating means further comprises speed responsive means for actuating said brake means when said output means rotates at a speed in excess by a predetermined amount over said input means while said automatic control means simultaneous disengages said first-mentioned clutch means and said further clutch means.

4. A transmission unit according to claim 3, wherein said automatic control means and said brake actuating means is operative to engage said further clutch means while disengaging said first-mentioned clutch means and said brake means during equality of speed of said input means and of said output means while engaging said first-mentioned clutch means and disengaging said further clutch means and said brake means when said output means exceeds the rotational speed of said input means.

5. A transmission unit comprising input means, a hydrodynamic transmission device operative with variable slippage and having a most favorable slip, change-speed transmission means having a plurality of transmission shafts including a transmission input shaft and a transmission output shaft and provided with selectively engageable clutch means to selectively engage the various transmission ratios thereof, disengageable means including intermediate change gear means having a predetermined transmission ratio for selectively connecting said input means with said input shaft over said hydrodynamic device, by-pass disengageable means for selectively connecting said input means directly with said input shaft in by-passing relationship with respect to said hydrodynamic device and said intermediate change gear means, said predetermined transmission ratio being such that one of said transmission shafts rotates at the same speed during engagement of said first-mentioned disengageable means and disengagement of said by-pass disengageable means in hydrodynamic operation when said hydrodynamic device operates at said most favorable slip as during disengagement of said first-mentioned disengageable means and engagement of said by-pass engageable means in by-pass operation, and automatic control means operative at said speed equality for automatically shifting from said hydrodynamic operation to said by-pass operation by disengaging said first-mentioned disengageable means and engagement of said by-pass disengageable means.

6. A transmission unit according to claim 5, wherein said most favorable slip is about 0.3.

7. A transmission unit according to claim 5, wherein said hydrodynamic device includes an impeller wheel and a turbine wheel, and brake means engageable to brake said impeller wheel, and wherein said automatic control means includes speed responsive means responsive, on the one hand, to the speed of said input means and, on the other, to the speed of said input shaft for engaging said first-mentioned disengageable means when said input means rotates faster than said pump wheel and for actuating said brake means when the speed of said input shaft exceeds the speed of said input means by a predetermined amount.

8. A transmission unit according to claim 5, wherein said hydrodynamic device includes an impeller wheel and a turbine wheel, further comprising brake means for said impeller wheel, and wherein said automatic control means is operative to engage said first-mentioned disengageable means with said input shaft rotating at a slower speed than said input means while simultaneously disengaging said by-pass disengageable means and said brake means, and to engage said by-pass disengageable means while disengaging said first-mentioned disengageable means and said brake means during speed equality of said input means and of said input shaft whereas, with said input shaft exceeding the speed of said input means by a predetermined amount said brake means is engaged while both said disengageable means are disengaged.

9. A transmission unit according to claim 5, wherein said change-speed transmission means is connected in said transmission unit rearwardly of said intermediate change gear means, said change-speed transmission means and said intermediate change gear means each being provided with a respective countershaft selectively operable to rotate at predetermined speeds with respect to each other.

10. A transmission unit according to claim 5, wherein said change-speed transmission means is combined with said intermediate change gear means into a unit having a common countershaft simultaneously serving as countershaft for said intermediate change gear means and said change-speed transmission means.

11. A transmission unit according to claim 5, wherein said selectively engageable clutch means are force-locking clutches for engaging the various speeds of said transmission means.

12. A transmission unit according to claim 5, wherein said selectively engageable clutch means are form-locking clutches operative to engage the respective speeds of said transmission.

13. A transmission unit according to claim 12, wherein said form-locking selectively engageable clutch means further comprise synchronized clutches.

14. A transmission unit according to claim 5, wherein said selectively engageable clutch means are force-locking clutches, and wherein said intermediate change gear means is so constructed that with said most favorable slip said input means and said input shaft have the same rotational speed, and wherein said automatic control means is operative to connect said input means and input shaft with each other by said by-pass disengageable means upon attaining rotational equality in speed therebetween.

15. A transmission unit according to claim 5, wherein said selectively engageable clutch means are form-locking devices and wherein said transmission ratio is so selected that said transmission output shaft with said hydrodynamic device operating at said most favorable slip and with an engaged lower speed has essentially the same rotational speed as with said by-pass disengageable means engaged and with a higher speed engaged.

16. A transmission unit according to claim 5, wherein said selectively engageable clutch means are form-locking devices, and wherein said transmission ratio is so selected that $$i_w = \frac{i_0 \cdot i_2}{i_1 \cdot i_{nopt}}$$

wherein $i_w$ is the transmission ratio of said intermediate change gear means, $i_0$ is the transmission ratio of a part of said change-speed transmission means, $i_2$ is the transmission ratio of a higher speed, $i_1$ is the transmission ratio of a lower speed, and $i_{nopt}$ is the rotational speed ratio between the driving and driven wheel of said hydrodynamic device when operating at said most favorable slip.

17. A transmission unit according to claim 5, further comprising speed preselection means, and wherein said automatic control means is operative with a preselection by said speed preselection means for a lower speed while giving gas to shift the transmission ratio of said change-speed transmission means without the aid of said hydrodynamic device if the rotational speed of said input shaft in the next lower speed is equal to the rotational speed of said engine shaft.

18. A transmission unit according to claim 5, wherein said hydrodynamic device includes brake means to render the same operative as a hydrodynamic brake, and wherein said automatic control means is operative to automatically and selectively actuate both of said disengageable means and said brake means, and manual means for selectively shifting said change-speed transmission means.

19. A transmission unit according to claim 5, further comprising semi-automatic means for preselecting the respective speeds of said change-speed transmission, and wherein said respective speeds are actually engaged only upon the occurrence of shifting conditions in said automatic control means.

20. A transmission unit according to claim 5, wherein said automatic control means is operative to also shift completely automatically said change-speed transmission means.

21. A transmission unit according to claim 5, wherein said hydrodynamic device includes a pump wheel and brake means for said pump wheel, and wherein said automatic control means is operative to actuate said brake means.

22. A transmission unit according to claim 21, wherein said automatic control means includes time delay means for engaging said brake means only after a predetermined time of the shifting of said disengageable means.

23. A transmission unit according to claim 5, wherein said automatic control means is operative to selectively and alternately actuate said disengageable means and thereupon causes shifting of said change-speed transmission means.

24. A transmission unit according to claim 5, wherein said hydrodynamic device includes a pump wheel and brake means for said pump wheel, and wherein said automatic control means includes means automatically operative to engage said brake means when the rotational speed of said input means exceeds the rotational speed of said input shaft by a predetermined amount of approximately thirty percent.

25. A transmission unit according to claim 5, wherein said automatic control means includes means to prevent the simultaneous engagement of said disengageable means.

26. A transmission unit according to claim 5, further comprising brake means for said hydrodynamic device to render the same operative as a hydrodynamic brake, and wherein said automatic control means is operative to disengage both of said disengageable means and said brake means during shifting of said change-speed transmission means.

27. A transmission unit according to claim 5, wherein said automatic control means includes means for rendering ineffective the automatic operation thereof.

28. A transmission unit according to claim 5, further comprising brake means for said hydrodynamic device, and wherein said automatic control means includes means responsive to the relative speed between said input means and said input shaft to selectively operate said control means having three positions, namely a first position corresponding to an increasing rotational speed of said input means with respect to one of said transmission shafts in which said first-mentioned disengageable means is engaged while said by-pass disengageable means and said brake means are disengaged, a second position wherein said first-mentioned disengageable means and said brake means are disengaged while said by-pass disengageable means is engaged, and a third position in which both disengageable means are disengaged and said brake means is engaged.

29. A transmission unit comprising an input shaft, a hydrodynamic device with brake means and operative at varying slippages with a most favorable slip, a change-speed gear having a predetermined ratio, an output shaft for said change-speed gear, and connecting means connecting said input shaft with said change-speed gear output shaft either in hydrodynamic operation through said hydrodynamic device and said change-speed gear or in by-passing operation directly to said change-speed gear output shaft in by-passing relationship to said hydrodynamic device, said transmission ratio being so selected that speed equality exists between said input and output shafts with said hydrodynamic device operating at said most favorable slip, said transmission unit being adapted to be shifted from hydrodynamic operation to by-passing operation upon equality in rotational speed between said transmission input shaft and said output shaft.

30. The combination according to claim 29, further comprising means for shifting from by-pass operation to said hydrodynamic operation with said input shaft rotating at a higher speed than said output shaft and for engaging said brake means with said output shaft exceeding the speed of said input shaft by a predetermined amount.

31. A transmission unit comprising input means, output means, a hydrodynamic transmission device, means constituting two motion transmitting trains for selectively and alternately connecting said input means with said output means, one of the said motion transmitting trains including said hydrodynamic device, change gear means having a predetermined transmission ratio and selectively engageable clutch means for connecting said hydrodynamic device and said change gear means with said input and output means, the other of said motion transmitting trains including further clutch means for directly connecting said input means with said output means in by-passing relationship with respect to said hydrodynamic device and said change gear means, said hydrodynamic device being operative at varying slippages with one predetermined slippage thereof being the most favorable one as regards operation of said hydrodynamic device, and said predetermined ratio being so selected that said output means rotates at essentially the same speed as said input means with said first-mentioned clutch means engaged and with said hydrodynamic device operating at said most favorable slippage.

32. A transmission unit comprising an input shaft, a hydrodynamic device operative at varying slippages with a most favorable slip, a change-speed gear having a predetermined ratio, an output shaft for said change-speed gear, and connecting means connecting said input shaft with said change-speed gear output shaft either in hydrodynamic operation through said hydrodynamic device and said change-speed gear or in by-passing operation directly to said change-speed gear output shaft in by-passing relationship to said hydrodynamic device, said transmission ratio being so selected that speed equality exists between said input and output shafts with said hydrodynamic device operating at said most favorable slip, said transmission unit being adapted to be shifted from hydrodynamic operation to by-passing operation upon equality in rotational speed between said transmission input shaft and said output shaft.

References Cited in the file of this patent
UNITED STATES PATENTS

| | | |
|---|---|---|
| 2,637,221 | Backus et al. | May 5, 1953 |
| 2,718,157 | Schaub | Sept. 20, 1955 |
| 2,726,746 | Herndon et al. | Dec. 13, 1955 |
| 2,727,601 | Shurts | Dec. 20, 1955 |
| 2,750,017 | Ahlen | June 12, 1956 |